(12) United States Patent
Kim et al.

(10) Patent No.: US 9,816,011 B2
(45) Date of Patent: Nov. 14, 2017

(54) PRESSURE SENSITIVE ADHESIVE COMPOSITION

(75) Inventors: Kee Young Kim, Daejeon (KR); Jeong Min Ha, Daejeon (KR); No Ma Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/580,889

(22) PCT Filed: Feb. 28, 2011

(86) PCT No.: PCT/KR2011/001405
§ 371 (c)(1),
(2), (4) Date: Aug. 23, 2012

(87) PCT Pub. No.: WO2011/105877
PCT Pub. Date: Sep. 1, 2011

(65) Prior Publication Data
US 2012/0321819 A1 Dec. 20, 2012

(30) Foreign Application Priority Data

Feb. 26, 2010 (KR) .................. 10-2010-0017536
Feb. 28, 2011 (KR) .................. 10-2011-0018058

(51) Int. Cl.
*C09J 133/08* (2006.01)
*C09J 7/02* (2006.01)
*G02B 1/14* (2015.01)
*G02B 1/16* (2015.01)
*G02B 1/10* (2015.01)

(52) U.S. Cl.
CPC ............ *C09J 7/0217* (2013.01); *C09J 133/08* (2013.01); *G02B 1/14* (2015.01); *G02B 1/16* (2015.01); *B32B 2457/202* (2013.01); *C09J 2203/318* (2013.01); *G02B 1/105* (2013.01); *Y10T 428/10* (2015.01); *Y10T 428/1059* (2015.01); *Y10T 428/2891* (2015.01)

(58) Field of Classification Search
CPC ..... C09J 133/08; C09J 7/00; C09J 7/02; C09J 7/0217; C09J 2203/318; G02B 5/20; G02B 1/105; G02F 1/1335; G02F 1/133528; Y10T 428/10; Y10T 428/1059; Y10T 428/2891
USPC ...... 428/1.1, 1.3, 1.31–1.33, 1.5, 1.54, 1.55, 428/1.6, 1.61–1.62, 343, 345, 346, 349, 428/355 R, 356, 355 EN, 355 AC; 427/207.1, 208, 204.4, 204.6, 204.8; 156/106, 247; 349/96–103, 122
See application file for complete search history.

(56) References Cited

U.S. PATENT DOCUMENTS

| | | | |
|---|---|---|---|
| 2004/0127594 A1 | 7/2004 | Yang et al. | |
| 2005/0191507 A1* | 9/2005 | Yang et al. | 428/523 |
| 2007/0148485 A1* | 6/2007 | Kusama | C09J 133/08 428/520 |
| 2007/0149715 A1* | 6/2007 | Lee et al. | 525/329.5 |
| 2010/0209631 A1 | 8/2010 | Kim et al. | |
| 2011/0122343 A1* | 5/2011 | Park et al. | 349/96 |
| 2011/0187970 A1 | 8/2011 | Kim et al. | |

FOREIGN PATENT DOCUMENTS

| | | | | |
|---|---|---|---|---|
| JP | 5-163468 A | 6/1993 | | |
| JP | 08143842 A * | 6/1996 | ............ | C09J 133/08 |
| JP | 11-256111 A | 9/1999 | | |
| JP | 2001-323239 A | 11/2001 | | |
| JP | 2005-023143 A | 1/2005 | | |
| JP | 2008-024818 | 2/2008 | | |
| JP | 2008-274494 A | 11/2008 | | |
| JP | 2009-045394 A | 3/2009 | | |
| JP | 2009-179781 | 8/2009 | | |
| JP | 2010-031255 A | 2/2010 | | |
| JP | 2010-037431 A | 2/2010 | | |
| JP | 2010-043184 | 2/2010 | | |
| JP | 2010-100760 | 5/2010 | | |
| JP | 2010-196003 | 9/2010 | | |
| JP | 2011-506670 A | 3/2011 | | |
| JP | 2011-511853 A | 4/2011 | | |
| JP | 2011-528392 A | 11/2011 | | |
| KR | 10-2006-0018495 A | 3/2006 | | |
| KR | 10-2006-0128659 A | 12/2006 | | |
| KR | 10-2009-0131222 A | 12/2009 | | |
| KR | 10-2010-0003715 A | 1/2010 | | |
| KR | 10-2010-0003716 A | 1/2010 | | |
| TW | 200930780 A | 7/2009 | | |
| TW | 201005058 A | 2/2010 | | |
| TW | I399419 | 6/2013 | | |
| TW | I402320 | 7/2013 | | |
| WO | 2009/075512 A2 | 6/2009 | | |
| WO | WO 2009075512 A2 * | 6/2009 | ............ | C09J 133/08 |
| WO | WO 2009088191 A2 * | 7/2009 | ............ | C09J 133/08 |
| WO | WO 2009131321 A2 * | 10/2009 | ............ | C09J 133/08 |
| WO | 2010/008231 A2 | 1/2010 | | |
| WO | WO 2010008231 A2 * | 1/2010 | ............ | C09J 133/08 |

* cited by examiner

Primary Examiner — Eli D Strah
(74) Attorney, Agent, or Firm — Dentons US LLP

(57) ABSTRACT

The present invention relates to a pressure sensitive adhesive composition, a protective film for optical elements, an optical element and a liquid crystal display device. The present invention may provide a pressure sensitive adhesive composition and a protective film for optical elements, having a high peel force at a low rate and a low peel force at a high rate, the balance of which is excellently maintained and showing excellent wettablity to an adherend, durability, repeelability, transparency and antistatic performance.

14 Claims, No Drawings

PRESSURE SENSITIVE ADHESIVE COMPOSITION

This application is a National Stage Entry of International Application No. PCT/KR2011/001405, filed Feb. 28, 2011, and claims the benefit of Korean Application Nos. 10-2010-0017536, filed on Feb. 26, 2010, and 10-2011-0018058, filed on Feb. 28, 2011, which are hereby incorporated by reference in their entirety for all purposes as if fully set forth herein.

DETAILED DESCRIPTION OF INVENTION

Technical Field

The present invention relates to a pressure sensitive adhesive composition, a protective film for optical elements, a polarizer and a liquid crystal display device.

Background Art

A liquid crystal display device may include various optical elements such as a polarizer, a retardation plate, an optical compensation film, a reflective sheet and a brightness enhancing film. To protect such optical elements during the manufacturing of liquid crystal display devices or shipping and distribution after production, protective films may be attached thereto.

In protective films for optical elements, it is very important to control the peel force in accordance with the peel rate. For example, the protective film needs to have a suitable peel force at a low rate to perform its role. If the peel force at a low rate is too low, it is easy for lifting to occur while tailoring optical elements, whereby they become vulnerable to contamination from the outside.

During the manufacturing of liquid crystal display devices, protective films for optical elements are removed at a certain time, where they are removed from the optical elements at high rate in view of productivity. Thus, if the pressure sensitive adhesive has too high of a peel force at a high rate, the liquid crystal panel is damaged, as well as the driving device in the panel, and the like, are damaged due to excessive static electricity.

Accordingly, the pressure sensitive adhesive in the protective films for optical elements needs to have both a high peel force at a low rate and a low peel force at a high rate simultaneously.

However, the peel forces of the pressure sensitive adhesive at a high rate and low rate tend to increase or decrease simultaneously depending on the degree of cross-linking, and the like. Therefore, it is a difficult problem for the adhesive to have a high peel force at a low rate and a low peel force at a high rate.

For example, various pressure sensitive adhesives are disclosed in Patent Reference Nos. 1 to 4, but there is a problem that said pressure sensitive adhesives have a poor balance of peel forces at low rates and high rates, as well as poor wettability or adhesiveness to an adherend, and the like.

PRIOR ART REFERENCES

Patent References (Patent Reference No. 1) JP publication of patent application No. H05-163468
(Patent Reference No. 2) JP publication of patent application No. H11-256111
(Patent Reference No. 3) JP publication of patent application No. 2001-323239
(Patent Reference No. 4) JP publication of patent application No. 2005-023143

DISCLOSURE

Technical Problem

The present invention intends to provide a pressure sensitive adhesive composition, a protective film for optical elements, a polarizer and a liquid crystal display device.

Technical Solution

The present invention relates to a pressure sensitive adhesive composition comprising an acrylic resin having a weight average molecular weight of 1,100,000 or less, wherein the composition comprises an interpenetrating polymer network structure (hereinafter, often referred to "IPN") having said acrylic resin in a cross-linked state, after hardening the composition, and has a peel force to a TAC (triacetyl cellulose) sheet of 8 to 40 gf/inch, as measured at a peel angle of 180° and a peel rate of 0.3 m/min, and a peel force to a TAC sheet of 80 to 300 gf/inch, as measured at a peel angel of 180° and a peel rate of 30 m/min, in a state including said structure.

The present pressure sensitive adhesive composition is explained in more detail below.

The present pressure sensitive adhesive composition comprises an acrylic resin having a weight average molecular weight of 1,100,000 or less, wherein after hardening, the composition comprises an IPN structure comprising a cross-linked structure that said acrylic resin is cross-linked and formed, and a cross-linked structure other than said cross-linked structure.

The term, "hardening of the pressure sensitive adhesive composition," means a state in which the pressure sensitive adhesive composition is irradiated with light or maintained at a certain temperature to develop adhesion properties by physical action or chemical reaction. The hardened pressure sensitive adhesive composition herein may be optionally used to have the same meaning as a pressure sensitive adhesive or a pressure sensitive adhesive layer.

In addition, the term, "irradiation with light," means irradiation with electromagnetic waves, wherein an example of said electromagnetic wave may include microwaves, infrared (IR), ultraviolet (UV), X-ray and γ-ray, or a particle beam such as α-particle beam, proton beam, neutron beam and electron beam.

The term, "IPN structure," means a state that at least two cross-linked structures are simultaneously present in the pressure sensitive adhesive after hardening. In one aspect, said at least two crosslinked structures may be in a state that each other is entangled. That is, the present pressure sensitive adhesive composition of the present invention comprises at least a crosslinked structure that said acrylic resin is crosslinked and embodied and other crosslinked structure than the cross-linked structure embodied from said acrylic resin. Here, the acrylic resin in the interpenetrating polymer network structure, may be included in a state cross-linked by a multi-functional cross-linker. The cross-linked structure of the acrylic resin cross-linked with the multi-functional cross-linker may be embodied by using a cross-linkable acrylic resin as a acrylic resin having a certain molecular weight included in said pressure sensitive adhesive composition, and crosslinking this cross-linkable acrylic resin with a multi-functional cross-linker in a process of hardening the pressure sensitive adhesive composition. The term, "a cross-linkable acrylic resin," means an acrylic resin that a functional group, which can be reacted with the multi-functional cross-linker mentioned below, is present in its side chain or end.

Considering the peel force of the pressure sensitive adhesive comprising the IPN structure, an acrylic resin having a weight average molecular weight ($M_w$) of 1,100,000 or less is used as said acrylic resin. Appropriate peel force characteristics at low and high rates may be embodied by using a resin with a weight average molecular weight of 1,100,000 or less as the acrylic resin which is included in the IPN, in a state crosslinked with a multi-functional cross-linker after hardening the composition. The weight average molecular weight herein means a value of converting to standard polystyrene as measured by GPC (gel permeation chromatography), and more specifically, means a value measured by a method specified in Measuring Method 1 mentioned below. Also, the term, "a molecular weight," means "a weight average molecular weight," unless specified otherwise.

The molecular weight of said acrylic resin may be preferably 10,000,000 or less, more preferably 800,000 or less, and still more preferably 600,000 or less. The low limit of the molecular weight of said acrylic resin is not particularly limited, and for example, may be controlled in a range of about 150,000 or more, preferably about 300,000 or more, considering cohesive force or durability of the pressure sensitive adhesive.

In one aspect, said acrylic resin may be an acrylic resin comprising a (meth)acrylic acid ester monomer; and a cross-linkable monomer as polymerized units.

As said (meth)acrylic acid ester monomer, for example, alkyl (meth)acrylate may be used, and considering cohesive force, glass transition temperature, or peel force, and the like, alkyl (meth)acrylate having an alkyl group with 1 to 14 carbon atoms, preferably 1 to 12 carbon atoms may be used. An example of such an alkyl (meth)acrylate may include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, isononyl (meth)acrylate, lauryl (meth)acrylate and tetradecyl (meth)acrylate, and the like, one or at least two of which may be contained in the resin as polymerized units.

In addition, said cross-linkable monomer may mean, for example, a monomer which can be copolymerized with said (meth)acrylic acid ester monomer and provide the resin with a cross-linkable functional group after copolymerization.

Said cross-linkable functional group may include, for example, a hydroxyl group, a carboxyl group, a glycidyl group, an isocyanate group or a nitrogen-containing functional group, and the like, wherein a hydroxyl group or a carboxyl group can be used generally. In this field, various cross-linkable monomers which can be used are known, considering the desired cross-linkable functional group, wherein all these monomers may be used. Examples of these monomers may include a monomer containing a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a monomer containing a carboxyl group such as (meth)acrylic acid, 2-(meth)acrylolyoxy acetic acid, 3-(meth)acryloyloxy propionic acid, 4-(meth)acryloyloxy butyric acid, acrylic acid dimer, itaconic acid, maleic acid and maleic acid anhydride; or a nitrogen-containing monomer such as (meth)acrylamide, N-vinyl pyrrolidone or N-vinyl caprolactam, and the like, one or at least two of which can be included in said acrylic resin as polymerized units, but is not limited thereto.

Said acrylic resin may comprise 80 to 99.8 parts by weight of said (meth)acrylic acid ester monomer and 0.01 to 10 parts by weight of a cross-linkable monomer as polymerized units, whereby physical properties such as cohesive force, peel force and durability may be appropriately maintained.

The term, "part by weight," herein means "ratio by weight" unless specified otherwise.

Said acrylic resin may further comprise a monomer, represented by the following chemical formula 1, as the unit of polymerization, if necessary.

[Chemical Formula 1]

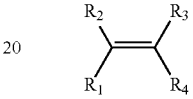

wherein, $R_1$ to $R_3$ represent each independently hydrogen or an alkyl group; $R_4$ represents a cyano group, a phenyl group un-substituted or substituted with an alkyl group, acetyloxy group or $COR_5$, where $R_5$ represents an amino or glycidyloxy group un-substituted or substituted with an alkyl or alkoxyalkyl group.

Said monomer of chemical formula 1 may be used to further control the physical properties of the pressure sensitive adhesive or to provide other functionality.

In definitions of $R_1$ to $R_5$ in said chemical formula 1, alkyl or alkoxy means alkyl or alkoxy with 1 to 8 carbon atoms, and preferably, may be methyl, ethyl, methoxy, ethoxy, propoxy or butoxy.

Said monomer of chemical formula 1 may be contained, for example, in an amount of 20 parts or less by weight relative to ratio by weight of the aforementioned (meth) acrylic acid ester monomer or cross-linkable monomer in the acrylic resin.

The acrylic resin as above may be prepared by known usual polymerization methods in this field. For example, it may be prepared by appropriately formulating a (meth) acrylic acid ester monomer, a cross-linkable monomer and/ or a monomer of chemical formula 1, and the like, according to the desired ratios by weight to prepare a monomeric mixture which is applied to usual polymerization methods such as solution polymerization, photo polymerization, bulk polymerization, suspension polymerization or emulsion polymerization. In this procedure, if necessary, a suitable polymerization initiator or chain transfer agent, and the like may be used together.

Said pressure sensitive adhesive composition may further comprise a multi-functional cross-linker which can be reacted with said acrylic resin to embody a crosslinked structure during the hardening procedure.

As the multi-functional cross-linker, for example, a suitable kind of the known cross-linkers such as an isocyanate cross-linker, an epoxy cross-linker, an aziridine cross-linker and a metal chelate cross-linker may be used, while considering the cross-linkable functional group included in said acrylic resin. An example of said isocyanate cross-linker may include a compound having at least two isocyanate groups such as tolylene diisocyanate, xylene diisocyanate, diphenylmethane diisocyanate, hexamethylene diisocyanate, isophoron diisocyanate, tetramethylxylene diisocyanate or naphthalene diisocyanate, and the like or a cross-linker obtained by reacting the above compound having at least two isocyanate groups with a polyol, which may include, for example, trimethylol propane, and the like. In addition, the epoxy cross-linker may include ethyleneglycol diglycidylether, triglycidylether, trimethylol propane triglycidylether, N,N,N',N'-tetraglycidyl ethylenediamine and/or glycerine diglycidylether; and an example of the aziridine cross-linker may include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and/or tri-1-aziridinylphosphineoxide, but is not limited thereto. An example of the metal chelate cross-linker may include a compound that a multivalent metal such as aluminum, iron, zinc, tin, titanium, antimony, magnesium or vanadium is coordinated to alkyl ester of acetyl acetone or acetoacetic acid, and the like, but is not limited thereto.

Said pressure sensitive adhesive composition or IPN structure may comprise said cross-linker in an amount of 0.01 to 10 parts by weight, more preferably 0.01 to 5 parts by weight, relative to 100 parts by weight of said acrylic resin. Cohesive force and durability of the pressure sensitive adhesive may be excellently maintained in this range.

Said pressure sensitive adhesive composition may further comprise a photopolymerizable compound as a component for embodying other kinds of cross-linked structures than the cross-linked structure embodied by cross-linking said acrylic resin. That is, said IPN structure may further comprise the cross-linked structure comprising the polymerized photopolymerizable compound. Such a cross-linked structure may be embodied by formulating the photopolymerizable compound to the pressure sensitive adhesive composition and polymerizing said photopolymerizable compound via light irradiation in a procedure of hardening the composition. The term, "a photopolymerizable compound," means a compound containing at least two photopolymerizable functional groups in the molecular structure, whereby it may be polymerized via light irradiation to embody a crosslinked structure. In addition, said photopolymerizable functional group is a functional group which can be polymerized or crosslinked by light irradiation, and its example may include a functional group comprising an ethylenic unsaturated double bond such as an acryloyl group or a methacryloyl group, but is not limited thereto.

As said photopolymerizable compound, for example, a multi-functional acrylate (MFA) may be used.

An example of the multifunctional acrylate may include a difunctional acrylate such as 1,4-butanediol di(meth)acrylate, 1,6-hexanediol di(meth)acrylate, neopentylglyco di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanulate, allylated cyclohexyl di(meth)acrylate, tricyclodecanedimethanol (meth)acrylate, dimethylol dicyclopentane di(meth)acrylate, ethyleneoxide modified hexahydrophthalic acid di(meth)acrylate, tricyclodecane dimethanol (meth)acrylate, neopentylglyco modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, 3-functional urethane (meth)acrylate or tris(meth)acryloxy ethylisocyanulate; a tetrafunctional acrylate such as diglycerine tetra(meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa(meth)acrylate, caprolactone modified dipentaerythritol hexa(meth)acrylate or urethane (meth)acrylate (ex. a reactant of an isocyanate monomer and tri methylolpropane tri(meth)acrylate), one or at least two of which may be used alone or in combination thereof, but is not limited thereto.

It is preferred in view of durability, herein to especially use an acrylate having a molecular weight of less than 1,000 and at least trifunctionality, that is, at least 3 (meth)acryloyl groups, but is not limited thereto.

In addition, it is preferred to use an acrylate comprising a cyclic structure and/or urethane bond in a molecular structure as a multifunctional acrylate. In this case, the cyclic structure included in the acrylate is any structure of a carbocyclic or heterocyclic structure; or a monocyclic or polycyclic structure. In particular, an example of the cyclic structure included in said multifunctional acrylate may include a cycloalkyl cyclic structure having 3 to 12 carbon atoms, preferably 3 to 8 carbon atoms, such as cyclopentane, cyclohexane or cycloheptane, at least one, preferably 1 to 5, and more preferably 1 to 3 of which may be included in the acrylate, and at least one heteroatom such as O, S or N may be also included therein.

A specific example of a multifunctional acrylate comprising a cyclic structure and/or urethane bond as above may include a monomer having an isocyanulate structure such as tris(meth)acryloxy ethyl isocyanulate; urethane acrylate (ex. a reactant of an isocyanate compound having a cyclic structure in the molecule, for example, isophorone disocyanate, and an acrylate compound, for example, trimethylolpropane tri(meth)acrylate or pentaerythritol tri(meth)acrylate, and the like), and so on, but is not limited thereto.

The photopolymerizable compound in said pressure sensitive adhesive composition or IPN structure may be contained in an amount of 1 to 30 parts by weight, preferably 3 to 25 parts by weight, more preferably 8 to 25 parts by weight and still more preferably 10 to 20 parts by weight, relative to 100 parts by weight of said acrylic resin, whereby the IPN structure may be effectively embodied, the peel forces at low and high rates be excellently maintained and the durability of the pressure sensitive adhesive be stably secured.

Also, the pressure sensitive adhesive composition may further comprise a photoinitiator. Said photoinitiator may carry out a polymerization reaction of the aforementioned photopolymerizable compound by light irradiation to provide a crosslinked structure inside of the pressure sensitive adhesive.

The photoinitiator is not particularly limited to any kind. A specific example of the photoinitiator may include benzoins, hydroxy ketones, aminoketones or phosphine oxides, and the like, and more particularly, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylprop-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2- hydroxy-2-methyl-1-[4-(1-methylvinyl)phenyl]propanone] and 2,4,6-trimethylbenzoyl-diphenyl-phosphineoxide, and the like, but is not limited thereto. Here, one or two or more of the foregoing may be used.

The photoinitiator may be included in an amount of 0.1 to 10 parts by weight, preferably 0.5 to 10 parts by weight, and more preferably 0.5 to 5 parts by weight, relative to 100 parts by weight of said photopolymerizable compound. If the content of the photoinitiator is too low, it is apprehended that the polymerization or hardening reaction will not be smoothly carried out. If the content is too high, it is apprehended that physical properties such as endurance reliability or transparency will be lowered.

The pressure sensitive adhesive composition may further comprise an antistatic agent, wherein as the antistatic agent any compound may be used, as long as it can have excellent compatibility with other components included in the composition, such as the acrylic resin, and give antistatic performance to the pressure sensitive adhesive, without any adverse effect on transparency, workability and durability thereof, and the like. An example of the antistatic agent may include inorganic salts or organic salts, and the like.

Said inorganic salt may be a salt comprising an alkali metal cation or an alkali earth metal cation as a cation component. A specific example of said cation may include one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$), calcium ion ($Ca^{2+}$), strontium ion ($Sr^{2+}$) and barium ion ($Ba^{2+}$), and the like, preferably, one or two or more of lithium ion ($Li^+$), sodium ion ($Na^+$), potassium ion ($K^+$), cesium ion ($Cs^+$), beryllium ion ($Be^{2+}$), magnesium ion ($Mg^{2+}$), calcium ion ($Ca^{2+}$) and barium ion ($Ba^{2+}$), and most preferably lithium ion ($Li^+$) in view of ion stability, and mobility in the pressure sensitive adhesive, but is not limited thereto.

In addition, said organic salt may be a salt comprising an onium cation as a cation component. The term, "an onium cation," means a positively (+) charged ion in which at least part of charges are localized in at least one atom selected from the group consisting of nitrogen (N), phosphorus (P) and sulfur (S). Said onium cation may be a cyclic or non-cyclic compound, wherein the cyclic compound may be a non-aromatic or aromatic compound. In addition, said cyclic compound may contain at least one heteroatom (ex. oxygen) rather than nitrogen, phosphorus or sulfur atom. Said cyclic or non-cyclic compound may be also optionally substituted with substituents such as hydrogen, alkyl or aryl. Also, said non-cyclic compound may comprise at least one, preferably, at least four substituents, wherein said substituent may be a cyclic or non-cyclic substituent or an aromatic or non-aromatic substituent.

In one aspect, said onium cation may be a nitrogen-containing cation, preferably, an ammonium ion. Said ammonium ion may be a quaternary ammonium ion or an aromatic ammonium ion.

It is preferred for said quaternary ammonium ion to specifically be a cation represented by the following chemical formula 2.

[Chemical Formula 2]

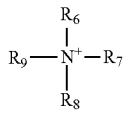

wherein, $R_6$ to $R_9$ represent each independently hydrogen; a substituted or un-substituted alkyl group; a substituted or un-substituted alkoxy group; a substituted or un-substituted alkenyl group; a substituted or un-substituted alkynyl group; a substituted or un-substituted aryl group; or a substituted or un-substituted heteroaryl group.

In definitions of said chemical formula 2, alkyl or alkoxy group may represent an alkyl or alkoxy group with 1 to 12 carbon atoms, preferably 1 to 8 carbon atoms, and an alkenyl or alkynyl group may represent an alkenyl or alkynyl group with 2 to 12 carton atoms, preferably 2 to 8 carbon atoms.

Also, in definitions of said chemical formula 2, aryl may represent a phenyl, biphenyl, naphthyl or anthracenyl ring system, and the like, as the substituent induced from an aromatic compound; heteroaryl means a 5 to 12-membered hetero ring or aryl ring containing at least one heteroatom selected from O, N and S and specifically, may represent furyl, pyrrolyl, pyrrolidinyl, thienyl, pyridinyl, piperidyl, indolyl, quinolyl, thiazole, benzthiazole and triazole, and the like.

Furthermore, in definitions of said chemical formula 2, alkyl, alkoxy, alkenyl, alkynyl, aryl or heteroaryl may be substituted with at least one substituent, wherein an example of the substituent may include a hydroxyl group, halogen or alkyl or alkoxy with 1 to 12 carbon atoms, preferably 1 to 8 carbon atoms and more preferably 1 to 4 carbon atoms, but is not limited thereto.

In the present invention, it is preferred to use a quaternary ammonium cation of cations of said chemical formula 2, and especially a cation, wherein $R_1$ to $R_4$ are each independently a substituted or unsubstituted alkyl group with 1 to 12 carbon atoms, preferably 1 to 8 carbon atoms.

A specific example of said quaternary ammonium ion represented by chemical formula 2 may include N-ethyl-N,N-dimethyl-N-(2-methoxyethyl)ammonium ion, N,N-diethyl-N-methyl-N-(2-methoxyethyl)ammonium ion, N-ethyl-N,N-dimethyl-N-propylammonium ion, N-methyl-N,N,N-trioctylammonium ion, N,N,N-trimethyl-N-propylammonium ion, tetrabutylammonium ion, tetramethylammonium ion, tetrahexylammonium ion and N-methyl-N,N,N-tributylammonium ion, and the like, but is not limited thereto.

In addition, an example of said aromatic ammonium ion may include one or more selected from the group consisting of pyridinium, pyridazinium, pyrimidinium, pyrazinium, imidazolium, pyrazolium, thiazolium, oxazolium and triazolium, and preferably one or at least two of N-alkyl pyridinium substituted with an alkyl group having 4 to 16 carbon atoms, 1,3-alkylmethyl imidazolium substituted with an alkyl group having 2 to 10 carbon atoms and 1,2-dimethyl-3-alkylimidazolium substituted with an alkyl group having 2 to 10 carbon atoms, but is not limited thereto.

Said aromatic ammonium ion may be also a compound represented by the following chemical formula 3.

[Chemical Formula 3]

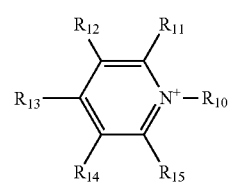

wherein, $R_{10}$ to $R_{15}$ represent each independently hydrogen; a substituted or un-substituted alkyl group; a substituted or unsubstituted alkoxy group; a substituted or unsubstituted alkenyl group; a substituted or unsubstituted alkynyl group; a substituted or unsubstituted aryl group; or a substituted or unsubstituted heteroaryl group.

In said chemical formula 3, definitions of alkyl, alkoxy, alkenyl, alkynyl, aryl and heteroaryl, and their substituents are the same as those in said chemical formula 2.

In said compound of chemical formula 3, it is especially preferred to be a compound, wherein $R_{11}$ to $R_{15}$ are each independently hydrogen or an alkyl group, and $R_{10}$ is an alkyl group.

In the present antistatic agent, an example of an anion included in inorganic or organic salts containing said cation is preferably selected from the group consisting of fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), sulfonate ($SO_4^-$), methylbenzenesulfonate ($CH_3(C_6H_4)SO_3^-$), p-toluenesulfonate ($CH_3C_6H_4SO_3^-$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), hexafluorophosphate ($PF_6^-$), trispentafluoroethyl trifluorophosphate ($P(C_2F_5)_3F_3^-$), bistrifluoromethanesulfonimide ($N(SO_2CF_3)_2^-$), bispentafluoroethanesulfonimide ($N(SOC_2F_5)_2^-$), bispentafluoroethanecarbonylimide ($N(COC_2F_5)_2^-$), bisperfluorobutanesulfonimide ($N(SO_2C_4F_9)_2^-$), bisperfluorobutanecarbonylimide ($N(COC_4F_9)_2^-$), tristrifluoromethanesulfonylmethide ($C(SO_2CF_3)_3^-$), and tristrifluoromethanecarbonylmethide ($C(CO_2CF_3)_3^-$), but is not limited thereto. Among said anions, it is preferred to use an imide anion which serves better to be electron withdrawing and is substituted with fluorine having good hydrophobicity to have high ion stability, but is not limited thereto.

The antistatic agent may be contained in an amount of 0.01 to 5 parts by weight, preferably 0.01 to 2 parts by weight, and more preferably 0.1 to 2 parts by weight, relative to 100 parts by weight of the acrylic resin in the pressure sensitive adhesive composition. If said amount is less than 0.01 parts by weight, it is apprehended that the desired antistatic effect will be not obtained. If it is in excess of 5 parts by weight, it is apprehended that since compatibility with other components becomes low, an endurance reliability or transparency of the pressure sensitive adhesive will be deteriorated.

The present pressure sensitive adhesive composition may further comprise a compound being capable of forming a coordination bond with said antistatic agent, specifically, the cation included therein, (hereinafter, optionally referred to "a coordination bond compound") together with the aforementioned components. If the coordination bond compound is suitably included, even though a relatively small quantity of the antistatic agent is used, an increased anion concentration inside the pressure sensitive adhesive may effectively give antistatic performance.

The usable coordination bond compound herein is not particularly limited to any kind, as long as it has a functional group being capable of coordination bonding in the molecule.

For example, as said coordination bond compound herein, an alkyleneoxide compound may be used.

Although the usable alkyleneoxide compound herein is not particularly limited to any kind, it is preferred to use an alkyleneoxide compound comprising alkyleneoxide units with at least two, preferably 3 to 12, more preferably 3 to 8 carbon atoms in their base units.

In addition, said alkyleneoxide compound herein has, preferably, a molecular weight of 5,000 or less. The term, "a molecular weight," herein means a molecular weight or a weight average molecular weight of a compound. If the molecular weight of the alkyleneoxide compound is in excess of 5,000, it is apprehended that due to too increased viscosity, coating properties will be deteriorated, or performance for forming a complex with a metal will be lowered. Meanwhile, the lower limit of molecular weight in said alkyleneoxide compound is not particularly limited, and may be suitably controlled in a range of, for example, 500 or more, preferably 4,000 or more.

A specific example of the usable alkyleneoxide chelate agent herein is not particularly limited, as long as it represents the aforementioned characteristics. For example, a compound represented by the following chemical formula 4 may be used.

[Chemical Formula 4]

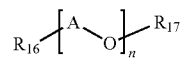

wherein, A represents alkylene group with at least 2 carbon atoms, n is 1 to 120, $R_{16}$ and $R_{17}$ represent each independently hydrogen, a hydroxyl group, an alkyl group or $—C(=O)R_{18}$, where $R_{18}$ represents hydrogen or an alkyl group.

In definitions of said chemical formula 4, alkylene group may represent an alkylene group with 3 to 12, preferably 3 to 8 carbon atoms, and specifically ethylene, propylene, butylene or pentylene.

Also, in definitions of chemical formula 4, alkyl group may represent an alkyl group with 1 to 12, preferably 1 to 8, and more preferably 1 to 4 carbon atoms, and n may represent preferably 1 to 80, more preferably 1 to 40.

A specific example of the compound represented by chemical formula 4 may include polyalkyleneoxides (ex. polyethyleneoxide, polypropyleneoxide, polybutyleneoxide or polypentyleneoxide, and the like), fatty acid alkyl esters of polyalkyleneoxides (ex. polyethyleneoxide, polypropyleneoxide, polybutyleneoxide or polypentyleneoxide, and the like) or carboxylic acid esters of polyalkyleneoxides (ex. polyethyleneoxide, polypropyleneoxide, polybutyleneoxide or polypentyleneoxide, and the like), but is not limited thereto.

Various coordination compounds such as ester compounds having at least one ether bond in a molecule as described in KR publication of patent application No. 2006-0018495, compounds containing oxalate groups as described in KR publication of patent application No. 2006-0128695, compounds containing diamine groups, compounds containing polycarboxyl groups or compounds containing ketone groups herein may be appropriately selected and used, if necessary, in addition to the aforementioned alkyleneoxide compounds.

Said coordination compound may be included in the pressure sensitive adhesive composition, in an amount of up to 3 parts by weight, preferably 0.1 to 3 parts by weight, and more preferably 0.5 to 2 parts by weight, relative to 100 parts by weight of the acrylic resin. If said amount is in excess of 3 parts by weight, it is apprehended that physical properties such as peel force will be lowered.

Said present pressure sensitive adhesive composition may further comprise a silane coupling agent. For example, the silane coupling agent may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetotrimethoxy silane, one or at least two of which may be used alone or in combination thereof. Here, it is preferred to use a silane coupling agent having an acetoacetate group or a β-cyanoacetyl group, which is not limited thereto. In the present composition, the silane coupling agent may be included in an amount of 0.01 to 5 parts by weight, preferably 0.01 to 1 part by weight, relative to 100 parts by weight of the acrylic resin. If the content of the coupling agent is less than 0.01 parts by weight, it is apprehended that the increased effect of adhesion strength will be slight. If it is in excess of 5 parts by weight, it is apprehended that endurance reliability will be lowered.

In view of controlling adhesion performance, the present pressure sensitive adhesive composition may further comprise a tackifying resin. The tackifying resin is not particularly limited to any kind. For example, one or at least two mixtures of a hydrocarbon resin or hydrogenated products thereof, a rosin resin or hydrogenated products thereof, a rosin ester resin or hydrogenated products thereof, a terpene resin or hydrogenated products thereof, a terpene phenol resin or hydrogenated products thereof, a polymerized rosin resin or a polymerized rosin ester resin may be used. Said tackifying resin may be included in an amount of 1 to 100 parts by weight, relative to 100 parts by weight of the acrylic resin. If said amount is less than 1 part by weight, it is apprehended that the effect of its addition will be slight. If it is in excess of 100 parts by weight, it is apprehended that the effect of enhancing compatibility and/or cohesive force will be lowered.

The present pressure sensitive adhesive composition may further comprise at least one additive selected from the group consisting of an epoxy resin, a cross-linker, a ultraviolet light stabilizer, an antioxidant, a colorant, a reinforcing agent, a filler, an antifoaming agent, a surfactant and a plasticizer in a range without affecting the effect of the invention.

Said pressure sensitive adhesive composition may have a gel fraction of 80% to 99% after hardening, that is, a state comprising the IPN structure. Here, the gel fraction is a value calculated by the following general formula 1.

Gel fraction=$B/A$×100     [General Formula 1]

wherein, A represents a mass of the pressure sensitive adhesive composition comprising the IPN structure, and B represents a dry mass of insoluble fractions recovered after depositing the same pressure sensitive adhesive composition as above in ethyl acetate at room temperature for 48 hours.

The pressure sensitive adhesive in the above range may effectively maintain peel force characteristics at low and high rates.

The present pressure sensitive adhesive composition has a peel force at a low rate ($X_1$) of 8 to 40 gf/inch, and a peel force at a high rate ($X_2$) of 80 to 300 gf/inch, after hardening, that is, in a state comprising the IPN structure. The term, "a peel force at low rate," means a peel force ($X_1$) to a TAC sheet, as measured at a peel angle of 180° and a peel rate of 0.3 m/min, and specifically, a peel force as measured according to a method specified in the following measuring method 1. In addition, the term, "a peel force at high rate," means a peel force ($X_2$) to a TAC sheet, as measured at a peel angle of 180° and a peel rate of 30 m/min, and specifically, a peel force as measured according to a method specified in the following measuring method 2.

The peel force ($X_1$) at a low rate may be, preferably 10 to 30 gf/inch, and more preferably 10 to 20 gf/inch. By controlling the peel force ($X_1$) at a low rate in said range, a pressure sensitive adhesive may be provided, which stably protects optical elements from contamination and does not damage them by peeling off the adhesive.

Also, the peel force ($X_2$) at a high rate may be, preferably, 100 to 280 gf/inch, more preferably, 100 to 200 gf/inch, and still more preferably, 100 to 150 gf/inch. By controlling the peel force at a high rate in said range, no damage to the adherend may be caused throughout the high rate peeling procedure, and occurrences of static electricity, and the like be effectively inhibited.

In addition, said ratio of the peel force ($X_2$) at a high rate to the peel force ($X_1$) at a low rate, that is, $X_2/X_1$ may be 1 to 15, preferably 5 to 15, and more preferably 7 to 13. By controlling said ratio ($X_2/X_1$) in the range of 1 to 15, the adhesive is capable of being effectively released upon peeling it off, allowing for excellent protective function as a protective film for optical elements.

The present invention also relates to a protective film for optical elements comprising a pressure sensitive adhesive layer which comprises an interpenetrating polymer network structure having an acrylic resin with a weight average molecular weight of 1,100,000 or less and in a cross-linked state; has a peel force to a TAC sheet of 8 to 40 gf/inch, as measured at a peel angle of 180° and a peel rate of 0.3 m/min; and a peel force to a TAC sheet of 80 to 300 gf/inch, as measured at a peel angel of 180° and a peel rate of 30 m/min.

The pressure sensitive adhesive layer of said protective film may be formed by hardening the aforementioned pressure sensitive adhesive composition according to the present invention. Therefore, individual components included in said pressure sensitive adhesive layer, or specific methods or values of measuring peel forces ($X_1$, $X_2$) at low and high rates in said pressure sensitive adhesive, and the like, are the same as descriptions of said pressure sensitive adhesive composition.

In addition, said protective film for optical elements may be, for example, one further comprising a substrate, wherein a pressure sensitive adhesive layer is formed on one or both sides of said substrate. As mentioned above, the pressure sensitive adhesive layer formed by hardening said pressure sensitive adhesive composition represents a high peel force at a low rate and a low peel force at a high rate and has a good balance between both peel forces. Also, said pressure sensitive adhesive layer may have excellent durability, workability, transparency and antistatic properties. Thus, said pressure sensitive adhesive composition may be effectively applied to various optical devices or elements, or display devices or elements. A pressure sensitive adhesive sheet consisting of a transparent substrate; and said pressure sensitive adhesive layer according to the present invention formed on said transparent substrate may be effectively used as a protective film for protecting optical elements, such as polarizing plates, retardation plates, optical compensation films, reflective sheets and brightness enhancing films, which are applied to liquid crystal display devices, and the like.

However, said protective film may be effectively used as various industrial sheets, for example, protective films, cleaning sheets, reflective sheets, structural pressure sensitive adhesive sheets, photographic pressure sensitive adhesive sheets, pressure sensitive adhesive sheets for indicating traffic lanes, optical pressure sensitive adhesive products or pressure sensitive adhesives for electronic elements, without being limited to the aforementioned uses. In addition, the acrylic composition according to the present invention may be effectively applied to multi-structured laminate products, general commercial pressure sensitive adhesive sheet products, medical patches, heat-activated pressure sensitive adhesives, and the like.

General transparent films in this field may be used as the substrate used in the protective film without any limitation, an example of which may include a plastic film such as a polyester film (ex., a polyethyleneterephthalate film, polybutyleneterephthalate film), a polytetrafluoroethylene film, a polyethylene film, a polypropylene film, a polybutene film, a polybutadiene film, a vinyl chloride copolymer film, or a polyamide film. Such a substrate film may consist of a single layer or at least two laminated layers, and optionally, further comprise a functional layer such as an antifouling layer or an antistatic layer. Also, in view of enhancing adhesiveness, a surface treatment such as a primer treatment may be carried out on one or both sides of said substrate.

A thickness of the substrate is suitably selected depending on its use and is not particularly limited, wherein the substrate may be formed in a thickness of usually 5 to 500 µm, and preferably 10 to 100 µm.

In addition, a thickness of said pressure sensitive adhesive layer is not particularly limited, and may be, for example, 2 to 100 µm, and preferably 5 to 50 µm. If the thickness of the pressure sensitive adhesive layer is out of the aforementioned range, it is apprehended that the physical properties of the pressure sensitive adhesive film will be uneven, since the uniform pressure sensitive adhesive layer is difficult to be formed.

A method of forming said pressure sensitive adhesive layer is not particularly limited, and for example, a method of applying said pressure sensitive adhesive composition or a coating liquid comprising the same on the substrate, and the like, by a usual means such as a bar coater and allowing it to harden, or a method of first applying the pressure sensitive adhesive composition to a surface of a releasable substrate, allowing it to harden, and then transferring the formed pressure sensitive adhesive layer, may be used.

In addition, a method of hardening the present pressure sensitive adhesive composition in the above procedures is not particularly limited, and, for example, it may be carried out via a suitable aging process such that the acrylic resin and the cross-linker are capable reacting, or light irradiation, for example, an ultraviolet irradiation, which may induce photopolymerization of photopolymerizable compounds. Said ultraviolet irradiation may be carried out using means such as a high pressure mercury lamp, an electrodeless lamp or a xenon lamp. Also, in the ultraviolet hardening method, the amount of irradiation is not particularly limited, as long as it is controlled to a degree that the sufficient hardening is obtained without damaging physical properties. For example, it is preferred that illuminance is 50 to 1,000 mW/cm$^2$ and light amount is 50 to 1,000 mJ/cm$^2$.

The present invention also relates to an optical element comprising a substrate; and the above protective film attached to one or both sides of said substrate.

Said substrate may be, for example, a polarizing plate, a retardation plate, an optical compensation film, a reflective sheet or a brightness enhancing film, and the like, and usually a polarizing plate, as a functional sheet which may be applied to a liquid crystal display device.

Said polarizing plate may have, for example, a structure comprising a polarizer; and a protective film for the polarizer formed on one or both sides of said polarizer. In addition, optionally, the present polarizing plate may further comprise at least one functional layer selected from the group consisting of a protective layer, a reflective layer, an antiglare layer, a retardation plate, a wide view angle compensation film and a brightness enhancing film.

The polarizer included in the polarizing plate is not particularly limited to any kind, and for example, general species, such as a polyvinyl alcohol polarizer, known in this field, may be adapted without any limitation.

The polarizer is a functional film or sheet that may extract only light vibrating in one direction from incident light vibrating in several directions. Such a polarizer may be in, for example, a form that dichroic colors are adsorbed and aligned to a polyvinyl alcohol resin film. For example, the polyvinyl alcohol resin constituting the polarizer may be obtained by gelating a polyvinlyacetate resin. Here, the usable polyvinylacetate resin may include a copolymer of vinyl acetate and other polymerizable monomers with vinyl acetate, as well as a homopolymer of vinyl acetate. In the above, an example of polymerizable monomers with vinyl acetate may include one or at least two, in combination thereof, of unsaturated carboxylic acids, olefins, vinyl ethers, unsaturated sulfonic acids and acrylamides with an ammonium group, but is not limited thereto. A degree of gelation of the polyvinyl alcohol resin may be usually 85 to 100 mol %, preferably at least 98 mol %. Said polyvinyl alcohol resin may be also additionally modified, and for example, polyvinyl formal and polyvinyl acetal modified with aldehydes may be also used. In addition, the polymerization degree of the polyvinyl alcohol resin may be usually 1,000 to 10,000, preferably 1,500 to 5,000.

The polyvinyl alcohol resin as above may be prepared into a film and used as a disk film of the polarizer. A method of forming a film from the polyvinyl alcohol resin is not particularly limited and general methods known in this field may be used. A thickness of the disk film formed by the polyvinyl alcohol resin is not particularly limited, which may be appropriately controlled in a range of, for example, 1 to 150 µm. Said thickness of the disk film may be controlled in at least 10 µm, considering ease of stretching.

The polarizer may be prepared via processes of stretching the polyvinyl alcohol resin film as above (ex. uniaxially stretching), dyeing the polyvinyl alcohol resin film with dichroic colors and adsorbing them thereto, treating the polyvinyl alcohol resin film with the adsorbed dichroic colors with a boric acid aqueous solution, and washing it after treating with a boric acid aqueous solution. As for the dichroic colors, iodine or dichroic organic dyes, and the like may be used.

In addition, the present polarizing plate may further comprise a protective film formed on one or both sides of said polarizer. Said protective film has a concept distinguished from the aforementioned protective film comprising the pressure sensitive adhesive layer according to the present invention. The protective film which can be included in the present polarizing plate is not particularly limited to any kind, and may be formed as a multi-layered film laminated with the protective film consisting of, for example, cellulose films such as triacetyl cellulose; polyester films such as polycarbonate films or polyethyleneterephthalate films; polyethersulfone films; and/or polyolefin films such as polyethylene films, polypropylene films, or polyolefin films having a cyclo or norbornene structure or polyolefin films such as ethylene propylene copolymer, and the like. Here, a thickness of said protective film is also not particularly limited and it may be formed to have a usual thickness.

The present invention also relates to a liquid crystal display device comprising a liquid crystal panel; and said optical element attached to one or both sides of said liquid crystal panel, wherein said optical element is a polarizing plate to which said protective film is usually attached.

The liquid crystal panel included in the liquid crystal display device is not particularly limited to any kind. For example, all various passive matrix types including TN (Twisted Nematic) type, STN (Super Twisted Nematic) type, F (ferroelectric) type and PD (polymer dispersed LCD) type, and the like; various active matrix types including two terminal type and three terminal type; the known liquid crystal panels including In-plane switching (IPS) mode panels and vertical alignment (VA) mode panels may be applied thereto. In addition, other components included in the liquid crystal display device of the present invention are not particularly limited to any kind, and the method of preparing the same is also not particularly limited. General constitutions in this field may be selected and used without limitation.

Advantageous Effects

The present invention may provide a pressure sensitive adhesive composition and a protective film for optical elements, having a high peel force at a low rate and a low peel force at a high rate, the balance of which is excellently maintained, and shows excellent wettablity to an adherend, durability, re-detachability, transparency and antistatic performance.

MODE FOR INVENTION

The present invention is explained in more detail through examples according to the present invention and comparative examples not according to the present invention below, but the scope of the present invention is not restricted by the following examples.

PREPARATION EXAMPLE 1

Preparation of Acrylic Resin (A1)

In a 1 L reactor with nitrogen gas refluxed and an installed refrigerator to easily regulate a temperature, 98 parts by weight of 2-ethylhexyl acrylate (2-EHA) and 2 parts by weight of 2-hydroxybutyl acrylate (2-HBA), and 100 parts by weight of ethyl acetate (EAc) as a solvent were poured. Subsequently, nitrogen gas was purged for 1 hour to remove oxygen, and the temperature was maintained at 62° C. Then, 0.03 parts by weight of a reaction initiator, azobisisobutyronitrile (AIBN), and 0.05 parts by weight of a molecular weight regulator, n-dodecylmercaptan (n-DDM), were poured, and reacted for 8 hours. Following the reaction, the reactant was diluted with ethyl acetate (EAc) to prepare an acrylic resin (A1) having a solid content concentration of 44% by weight and a weight average molecular weight ($M_w$) of 450,000.

PREPARATION EXAMPLE 2

Preparation of Acrylic Resin (A2)

In a 1 L reactor with nitrogen gas refluxed and an installed refrigerator to easily regulate a temperature, 97.5 parts by weight of butyl acrylate (BA) and 1.5 parts by weight of 2-hydroxybutyl acrylate (2-HBA), and 100 parts by weight of ethyl acetate (EAc) as a solvent were poured. Subsequently, nitrogen gas was purged for 1 hour to remove oxygen, and the temperature was maintained at 62° C. Then, 0.03 parts by weight of azobisisobutyronitrile (AIBN) and 0.05 parts by weight of n-dodecylmercaptan (n-DDM) were poured, reacted for 8 hours and diluted with ethyl acetate (EAc) to prepare an acrylic resin (A2) having a solid content concentration of 44% by weight and a weight average molecular weight ($M_w$) of 600,000.

PREPARATION EXAMPLE 3

Preparation of Acrylic Resin (A3)

In a 1 L reactor with nitrogen gas refluxed and an installed refrigerator to easily regulate a temperature, 99 parts by weight of 2-ethylhexyl acrylate (2-EHA) and 1 part by weight of hydroxybutyl acrylate (2-HBA), and 100 parts by weight of ethyl acetate (EAc) as a solvent were poured. Subsequently, nitrogen gas was purged for 1 hour to remove oxygen. With maintaining the temperature in the reactor at 60° C., 0.01 parts by weight of azobisisobutyronitrile (AIBN) was poured, reacted for 8 hours and diluted with ethyl acetate (EAc) to prepare an acrylic resin (A3) having a solid content concentration of 44% by weight and a weight average molecular weight ($M_w$) of 1,200,000.

PREPARATION EXAMPLE 4

Preparation of Acrylic Resin (A4)

In a 1 L reactor with nitrogen gas refluxed and an installed refrigerator to easily regulate a temperature, 99 parts by weight of 2-ethylhexyl acrylate (2-EHA) and 1 part by weight of acrylic acid (AA), and 100 parts by weight of ethyl acetate (EAc) as a solvent were poured. Subsequently, nitrogen gas was purged for 1 hour, and the temperature was maintained at 62° C. Then, 0.03 parts by weight of azobisisobutyronitrile (AIBN) and 0.05 parts by weight of n-dodecylmercaptan (n-DDM) were poured, reacted for 8 hours and diluted with ethyl acetate (EAc) to prepare an acrylic resin (A4) having a solid content concentration of 44% by weight and a weight average molecular weight ($M_w$) of 600,000.

PREPARATION EXAMPLE 5

Preparation of Acrylic Resin (A5)

In a 1 L reactor with nitrogen gas refluxed and an installed refrigerator to easily regulate a temperature, 98 parts by weight of 2-ethylhexyl acrylate (2-EHA) and 2 parts by weight of 2-hydroxybutyl acrylate (2-HBA), and 100 parts by weight of ethyl acetate (EAc) as a solvent were poured. Subsequently, nitrogen gas was purged for 1 hour to remove oxygen, and the temperature was maintained at 60° C. Then, 0.03 parts by weight of a reaction initiator, azobisisobuty-ronitrile (AIBN), and 0.01 parts by weight of a molecular weight regulator, n-dodecylmercaptan (n-DDM), were poured, and reacted for 8 hours. Following the reaction, the reactant was diluted with ethyl acetate (EAc) to prepare an acrylic resin (A5) having a solid content concentration of 44% by weight and a weight average molecular weight ($M_w$) of 800,000.

PREPARATION EXAMPLE 6

Preparation of Acrylic Resin (A6)

In a 1 L reactor with nitrogen gas refluxed and an installed refrigerator to easily regulate a temperature, 99 parts by weight of 2-ethylhexyl acrylate (2-EHA) and 1 parts by weight of 2-hydroxybutyl acrylate (2-HBA), and 100 parts by weight of ethyl acetate (EAc) as a solvent were poured. Subsequently, nitrogen gas was purged for 1 hour to remove oxygen, and the temperature was maintained at 60° C. Then, 0.01 parts by weight of a reaction initiator, azobisisobutyronitrile (AIBN), and 0.02 parts by weight of a molecular weight regulator, n-dodecylmercaptan (n-DDM), were poured, and reacted for 8 hours. Following the reaction, the reactant was diluted with ethyl acetate (EAc) to prepare an acrylic resin (A6) having a solid content concentration of 44% by weight and a weight average molecular weight ($M_w$) of 1,000,000.

EXAMPLE 1

Preparation of Pressure Sensitive Adhesive Composition 100 g of the acrylic resin (A1) of Preparation Example 1, 10 g of trimethylolpropane triacrylate, 1.5 g of a photoinitiator (2,2-dimethoxy-1,2-diphenylethanone), 1.5 g of a cross-linker (tolylenediisocyanate adduct of trimethylolpropane), 0.3 g of LiTFSi (lithium bis(trifluoromethanesulfonyl)imide) and 1.2 g of polyethyleneglycol bis(2-hexanoate) were homogeneously formulated and diluted to a proper concentration, considering coating performance, to prepare a pressure sensitive adhesive composition.

Preparation of Protective Film for Optical Elements

The above pressure sensitive adhesive composition was coated on one side of a biaxially-stretched PET (poly(ethylene terephthalate)) film (thickness: 38 μm)) and dried to form a uniform coating layer having a thickness of 20 μm. Subsequently, a release film was laminated on the coating layer, followed by carrying out the ultraviolet treatment under the following condition with a high pressure mercury lamp. Then, it was aged at 50° C. for 3 days to prepare a protective film.

<Ultraviolet Treatment Condition>

Illuminance: about 700 mW/cm² to 750 mW/cm²,

Light amount: about 150 mJ/cm² to 200 mJ/cm²

EXAMPLES 2 TO 9 AND COMPARATIVE EXAMPLES 1 TO 7

Pressure sensitive adhesive compositions and protective films were prepared by the same method as that of Example 1, except for changing the composition ratios of the pressure sensitive adhesive compositions as represented in the following table 1 or 2 and regulating the irradiation conditions considering their composition ratios, if the ultraviolet irradiation needed, such that the composition can be sufficiently hardened.

TABLE 1

| | Examples | | | | | | | | |
|---|---|---|---|---|---|---|---|---|---|
| | 1 | 2 | 3 | 4 | 5 | 6 | 7 | 8 | 9 |
| Resin (A1) | 100 | 100 | — | — | — | 100 | — | — | — |
| Resin (A2) | — | — | 100 | — | — | — | 100 | — | — |
| Resin (A4) | — | — | — | 100 | 100 | — | — | — | — |
| Resin (A5) | — | — | — | — | — | — | — | 100 | — |
| Resin (A6) | — | — | — | — | — | — | — | — | 100 |
| Crosslinker A | 1.5 | 0.5 | 2 | — | — | 0.5 | 0.5 | 0.5 | 2.0 |
| Crosslinker B | — | — | — | 1.5 | 1.5 | — | — | — | — |
| MFA | 10 | 20 | 7.5 | 15 | 7.5 | 3.0 | 7.5 | 5.0 | 5.0 |
| Photoinitiator | 1.5 | 3.0 | 0.5 | 1.0 | 0.5 | 0.5 | 0.5 | 1.0 | 1.0 |
| Plasticizer | 1.2 | 1.2 | 1.2 | 1.2 | 1.2 | 2.0 | 1.2 | 1.2 | 1.2 |
| Metal salt | 0.3 | 0.3 | 0.3 | 0.3 | 0.3 | 0.3 | 0.3 | 0.3 | 0.3 |

Content Unit: Part by weight
Crosslinker A: Tolylenediisocianate adduct of trimethylolpropane
Crosslinker B: N,N,N',N'-tetraglycidyl ethylenediammine
MFA: Trimethylolpropane triacrylate
Photoinitiator: 2,2-dimethoxy-1,2-diphenylethanone (Irgacure 651)
Plasticizer: Polyethyleneglycol bis(2-hexanoate)
Metal salt: Lithium bis(trifluoromethanesulfonyl)imide

TABLE 2

| | Comparative Examples | | | | | | |
|---|---|---|---|---|---|---|---|
| | 1 | 2 | 3 | 4 | 5 | 6 | 7 |
| Resin(A1) | 100 | 100 | — | — | — | 100 | — |
| Resin(A2) | — | — | — | — | — | — | 100 |
| Resin(A3) | — | — | 100 | — | — | — | — |
| Resin(A4) | — | — | — | — | — | — | — |
| Crosslinker A | 3 | 12 | 5 | — | — | 0.5 | 2 |
| Crosslinker B | — | — | — | — | — | — | — |
| MFA | — | — | — | 100 | 100 | 35 | 35 |
| Photoinitiator | — | — | — | 15 | 1 | 3.5 | 3 |
| Plasticizer | 1.2 | 1.2 | 1.2 | 1.2 | 1.2 | 1.2 | 1.2 |
| Metal salt | 0.3 | 0.3 | 0.3 | 0.3 | 0.3 | 0.3 | 0.3 |

Content Unit: Part by weight
Crosslinker A: Tolylenediisocianate adduct of trimethylolpropane
Crosslinker B: N,N,N',N'-tetraglycidyl ethylenediammine
MFA: Trimethylolpropane triacrylate
Photoinitiator: 2,2-dimethoxy-1,2-diphenylethanone (Irgacure 651)
Plasticizer: Polyethyleneglycol bis(2-hexanoate)
Metal salt: Lithium bis(trifluoromethanesulfonyl)imide For pressure sensitive adhesives or pressure sensitive adhesive films (protective films) prepared in Examples and Comparative Examples, their physical properties were evaluated by the following manner.

Measurement Method 1: Measuring Weight Average Molecular Weight

The weight average molecular weight of the acrylic resin was measured under the following conditions using GPC. Using standard polystyrene on Agilent system for preparing calibration curves, the measuring results were converted.

<Conditions of Measuring Weight Average Molecular Weight>

Measuring Instrument Agilent GPC (Agilent 1200 series, USA)

Column: linked two PL Mixed B

Column temperature: 40° C.

Eluent: Tetrahydrofuran

Flow rate: 1.0 mL/min

Concentration: ~2 mg/mL (100 μL injection)

Measurement Method 2: Measuring Peel Forces at Low and High Rates to TAC Sheet

The peel force ($X_1$) at a low rate and the peel force ($X_2$) at a high rate were measured in accordance with the following procedures. The prepared protective film for optical elements was cut to a size of 10 inch×1 inch (width×length). Subsequently, the cut film was attached to a TAC sheet (Trade name: UZ-TAC, manufactured by Fuji Film Corporation (Japan)) using a 2 Kg roller in accordance with JIS Z 0237. Then, the TAC sheet, to which the protective film was attached, was stored at a temperature of 23° C. and a relative humidity of 65% for 24 hours. Subsequently, using a tensile tester at room temperature, the protective film was peeled off at a peel angle of 180° at a peel rate of 0.3 m/min to measure the peel force ($X_1$) at a low rate, and also peeled off at a peel angle of 180° and a peel rate of 30 m/min to measure the peel force ($X_2$) at a high rate.

Measurement Method 3: Measuring Peel Forces at Low and High Rates to AG Sheet

The peel force ($X_1$) at a low rate and the peel force ($X_2$) at a high rate were measured in accordance with the following procedures. The prepared protective film for optical elements was cut to a size of 10 inch×1 inch (width×length). Subsequently, the cut film was attached to an antiglare (AG) sheet (Trade name: AGL25, manufactured by DNP (Japan)) using a 2 Kg roller in accordance with JIS Z 0237. Then, the AG sheet, to which the protective film was attached, was stored at a temperature of 23° C. and a relative humidity of 65% for 24 hours. Subsequently, using a tensile tester at room temperature, the protective film was peeled off at a peel angle of 180° and a peel rate of 0.3 m/min to measure the peel force ($X_1$) at a low rate, and also peeled off at a peel angle of 180° and a peel rate of 30 m/min to measure the peel force ($X_2$) at high rate.

Measurement Method 4: Measuring Wettability

Each protective film prepared in Examples and Comparative Examples was attached to a polarizing plate and cut to a size of 2.5 cm×25 cm (width×length) to prepare a sample. The prepared sample was attached to a glass substrate using double-sided tape. Then, the protective film was peeled off from the sample, the peeled off protective film was again placed on a polarizing plate. A certain pressure was applied to points which uniformly trisected the longitudinal direction of the protective film, in order to measure the time that the protective film was thoroughly wet to a surface of the polarizing plate and evaluate wettability according to the following criteria.

<Criteria for Evaluating Wettability>

◎: less than 10 seconds to thoroughly wet a surface of the polarizing plate

○: at least 10 seconds and less than 15 seconds to thoroughly wet a surface of the polarizing plate Δ: at least 15 seconds and less than 20 seconds to thoroughly wet a surface of the polarizing plate ×: at least 30 seconds to thoroughly wet a surface of the polarizing plate Measurement Method 5: Measuring Heat Resistance Each protective film prepared in Examples and Comparative Examples was attached to each side of a TAC sheet (UZ-TAC, manufactured by Fuji Film Corporation (Japan)) and a AG sheet (Trade name: AGL25, manufactured by DNP (Japan)) using a 2 Kg roller, and held in an oven at 50° C. for 7 days, followed by measuring peel forces at low and high rates at room temperature by the same method as described above to evaluate heat resistance according to the following criteria.

<Criteria for Evaluating Heat Resistance>

○: peel forces at low and high rates represent 1.2 times or less than those in the first stage Δ: peel forces at low and high rates represent more than 1.2 times and 1.5 times or less than those in the first stage ×: peel forces at low and high rates represent 2 times or more than those in the first stage Measurement Method 6: Measuring Peel-Off Constant Voltage Each protective film prepared in Examples and Comparative Examples was attached to each side of a TAC sheet (UZ-TAC, manufactured by Fuji Film Corporation (Japan)) and a AG sheet (Trade name: AGL25, manufactured by DNP (Japan)) using a 2 Kg roller, and stored at a temperature of 23° C. and a relative humidity of 50% for 24 hours to prepare a sample (sample shape: rectangular, sample size: ratio of width and length (width: length)=3:4, diagonal line=15 inch). A constant voltage occurred during the peeling-off of the film from each sample at a peel rate of 40 m/min was measured at a 1 cm height from the sample surface with a constant voltage measuring instrument (STATIRON-M2). In each case, the constant voltage was measured 3 times and averaged to evaluate the peel-off constant voltage according to the following criteria.

<Evaluation Criteria>

○: peel-off constant voltage of 0.5 kV or less

×: peel-off constant voltage of more than 0.5 kV

Measurement Method 7: Heat Resistant Peel-Off Constant Voltage

The sample which was prepared by the same method as that in the above measurement method 6 was held in an oven at 50° C. for 7 days, and a peel-off constant voltage was measured at room temperature by the same method as the above measurement method 6 to evaluate the heat resistant peel-off constant voltage according to the following criteria.

<Evaluation Criteria>

○: peel-off constant voltage of 0.5 kV or less

×: peel-off constant voltage of more than 0.5 kV

Physical properties measured by the above methods were organized and described in the following tables 3 to 5.

TABLE 3

| | | | Examples | | | | |
|---|---|---|---|---|---|---|---|
| | | | 1 | 2 | 3 | 4 | 5 |
| Peel Force (gf/inch) | AG sheet | Low Rate ($X_1$) | 12.3 | 10.5 | 14.2 | 10.8 | 12.3 |
| | | High Rate ($X_2$) | 105 | 100 | 125 | 105 | 114 |
| | TAC sheet | Low Rate ($X_1$) | 14.5 | 11.2 | 16.5 | 10.7 | 13.7 |
| | | High Rate ($X_2$) | 117 | 120 | 130 | 110 | 121 |
| Wettability | | | ◎ | ◎ | ◎ | ◎ | ◎ |
| Heat Resistance | | | ○ | ○ | ○ | ○ | ○ |
| Peel-off Constant Voltage | | | ○ | ○ | ○ | ○ | ○ |
| Heat Resistant Peel-off Constant Voltage | | | ○ | ○ | ○ | ○ | ○ |

TABLE 4

| | | | Examples | | | |
|---|---|---|---|---|---|---|
| | | | 6 | 7 | 8 | 9 |
| Peel Force (gf/inch) | AG sheet | Low Rate ($X_1$) | 33.2 | 19.0 | 15.5 | 8.1 |
| | | High Rate ($X_2$) | 248 | 140 | 221 | 92 |
| | TAC sheet | Low Rate ($X_1$) | 39.2 | 22.5 | 19.4 | 8.5 |
| | | High Rate ($X_2$) | 270 | 141 | 232 | 97 |

TABLE 4-continued

|  | Examples | | | |
|---|---|---|---|---|
|  | 6 | 7 | 8 | 9 |
| Wettability | ◎ | ◎ | ◎ | ◎ |
| Heat Resistance | ○ | ○ | ○ | ○ |
| Peel-off Constant Voltage | ○ | ○ | ○ | ○ |
| Heat Resistant Peel-off Constant Voltage | ○ | ○ | ○ | ○ |

TABLE 5

| | | | Comparative Examples | | | | | | |
|---|---|---|---|---|---|---|---|---|---|
| | | | 1 | 2 | 3 | 4 | 5 | 6 | 7 |
| Peel Force (gf/inch) | AG sheet | Low Rate ($X_1$) | 6.7 | 3.1 | 2.4 | 2.4 | 7.1 | 5.3 | 4.7 |
| | | High Rate ($X_2$) | 350 | 90 | 75 | 85 | 210 | 110 | 120 |
| | TAC sheet | Low Rate ($X_1$) | 9.2 | 4.0 | 2.5 | 2.4 | 8.3 | 7.0 | 4.4 |
| | | High Rate ($X_2$) | 370 | 101 | 92 | 87 | 216 | 121 | 124 |
| Wettability | | | ◎ | Δ | Δ | X | X | Δ | Δ |
| Heat Resistance | | | X | Δ | Δ | ○ | ○ | Δ | Δ |
| Peel-off Constant Voltage | | | ○ | ○ | ○ | ○ | ○ | ○ | ○ |
| Heat Resistant Peel-off Constant Voltage | | | X | ○ | ○ | ○ | ○ | ○ | ○ |

The invention claimed is:

1. A protective film for optical elements comprising a pressure sensitive adhesive layer formed by hardening a pressure sensitive adhesive composition comprising an acrylic resin with a weight average molecular weight of 450,000 to 1,100,000, a multi-functional crosslinker, a photopolymerizable compound and a photo initiator,
   wherein the multi-functional crosslinker having at least three functional groups, and is present in an amount of 0.5 to 2 parts by the weight relative to 100 parts by weight of the acrylic resin,
   wherein the photopolymerizable compound comprising a multifunctional acrylate having at least 3 (meth)acryloyl groups and is present in an amount of 3 to 20 parts by weight relative to 100 parts by weight of the acrylic resin,
   wherein the photoinitiator is present in an amount of 0.1 to 10 parts by weight relative to 100 parts by weight of the acrylic resin,
   wherein after hardening, the composition comprises an interpenetrating polymer network structure having said acrylic resin cross-linked by the multi-functional crosslinker and a polymerized product of the photopolymerizable compound, and has a peel force to a TAC (triacetyl cellulose) sheet of 10 to 40 gf/inch, as measured at a peel angle of 180° and a peel rate of 0.3 m/min, and a peel force to a TAC sheet of 80 to 300 gf/inch, as measured at a peel angle of 180° and a peel rate of 30 m/min, and
   wherein a ratio ($X_2/X_1$) of the peel force ($X_2$) to a TAC sheet, as measured at a peel angle of 180° and a peel rate of 30 m/min, to the peel force ($X_1$) to a TAC sheet, as measured at a peel angle of 180° and a peel rate of 0.3 m/min, after hardening the composition, is 5 to 13.

2. The protective film for optical elements according to claim 1, wherein the acrylic resin has a weight average molecular weight of 450,000 to 1,000,000.

3. The protective film for optical elements according to claim 1, further comprising an antistatic agent.

4. The protective film for optical elements according to claim 1, wherein a gel content in the state including the interpenetrating polymer network structure is 80 to 99%.

5. The protective film for optical elements according to claim 1, wherein the peel force to a TAC sheet, as measured at a peel angle of 180° and a peel rate of 0.3 m/min, after hardening the composition, is 10 to 30 gf/inch.

6. The protective film for optical elements according to claim 1, wherein the peel force to a TAC sheet, as measured at a peel angle of 180° and a peel rate of 30 m/min, after hardening the composition, is 100 to 280 gf/inch.

7. The protective film according to claim 1, wherein the multi-functional crosslinker has four functional groups.

8. The protective film according to claim 1, wherein the photopolymerizable compound has a molecular weight of less than 1,000.

9. The protective film according claim 1, wherein the multifunctional cross-linker is a tolylenediisocyanate adduct of trimethylolpropane or N,N,N',N'-tetraglycidyl ethylenediamine.

10. The protective film according to claim 1, wherein after hardening, the composition has a gel fraction of 80%-90%, the gel fraction calculated as: gel fraction =B/A×100, wherein A is a mass of the pressure sensitive adhesive composition comprising the interpenetrating polymer network (IPN) structure, and B is a dry mass of insoluble fractions recovered after depositing the pressure sensitive adhesive composition in ethyl acetate at room temperature for 48 hours.

11. The protective film according to claim 1, wherein the acrylic resin comprises 80-99.8 parts by weight (meth)acrylic acid ester monomers and 0.01-10 parts by weight of cross-linkable monomers, relative to 100 total parts by weight of all acrylic resin monomers.

12. An optical element comprising a substrate; and a protective film according to claim 1 attached to one or both sides of said substrate.

13. The optical element according to claim 12, wherein the substrate is a polarizing plate, a retardation plate, an optical compensation film, a reflective sheet or a brightness enhancing film.

14. A liquid crystal display device comprising a liquid crystal panel; and an optical element according to claim 13 attached to one or both sides of said liquid crystal panel.

* * * * *